June 6, 1961
W. D. COLE
2,987,038
AUTOMATIC LAYING CAGE BATTERY
Filed April 15, 1958
4 Sheets-Sheet 1
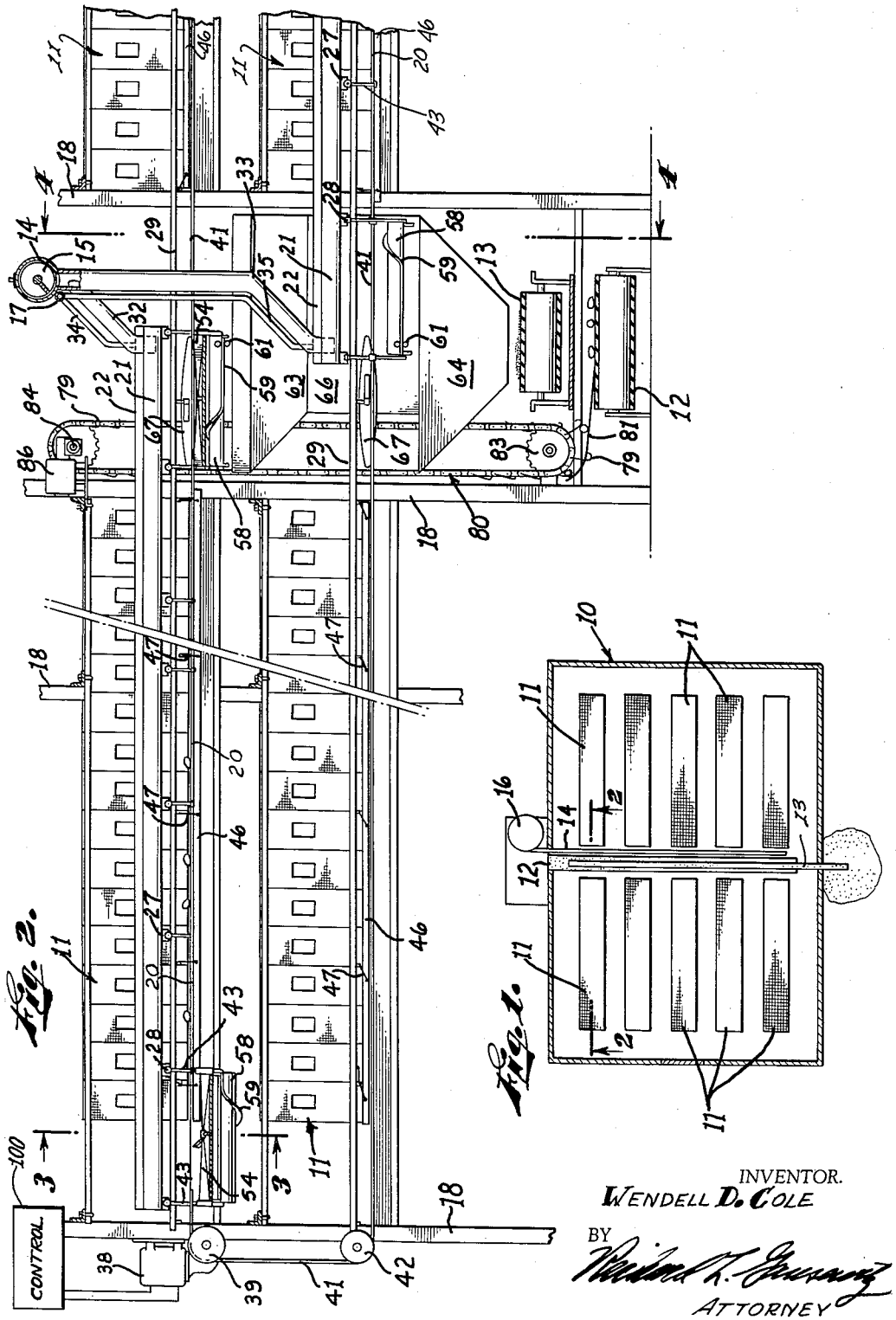
INVENTOR.
WENDELL D. COLE
BY
ATTORNEY

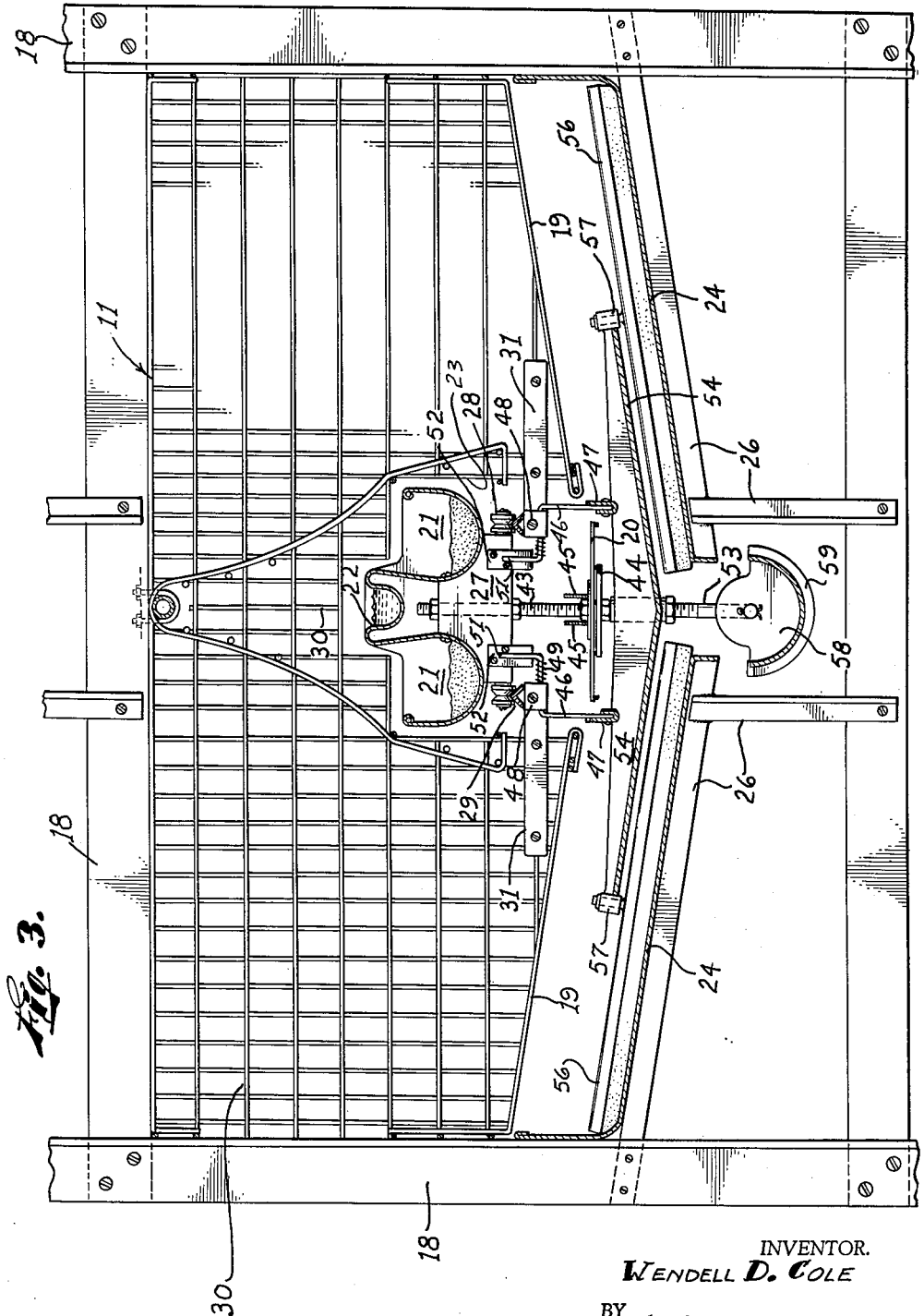

June 6, 1961 W. D. COLE 2,987,038
AUTOMATIC LAYING CAGE BATTERY
Filed April 15, 1958 4 Sheets-Sheet 3
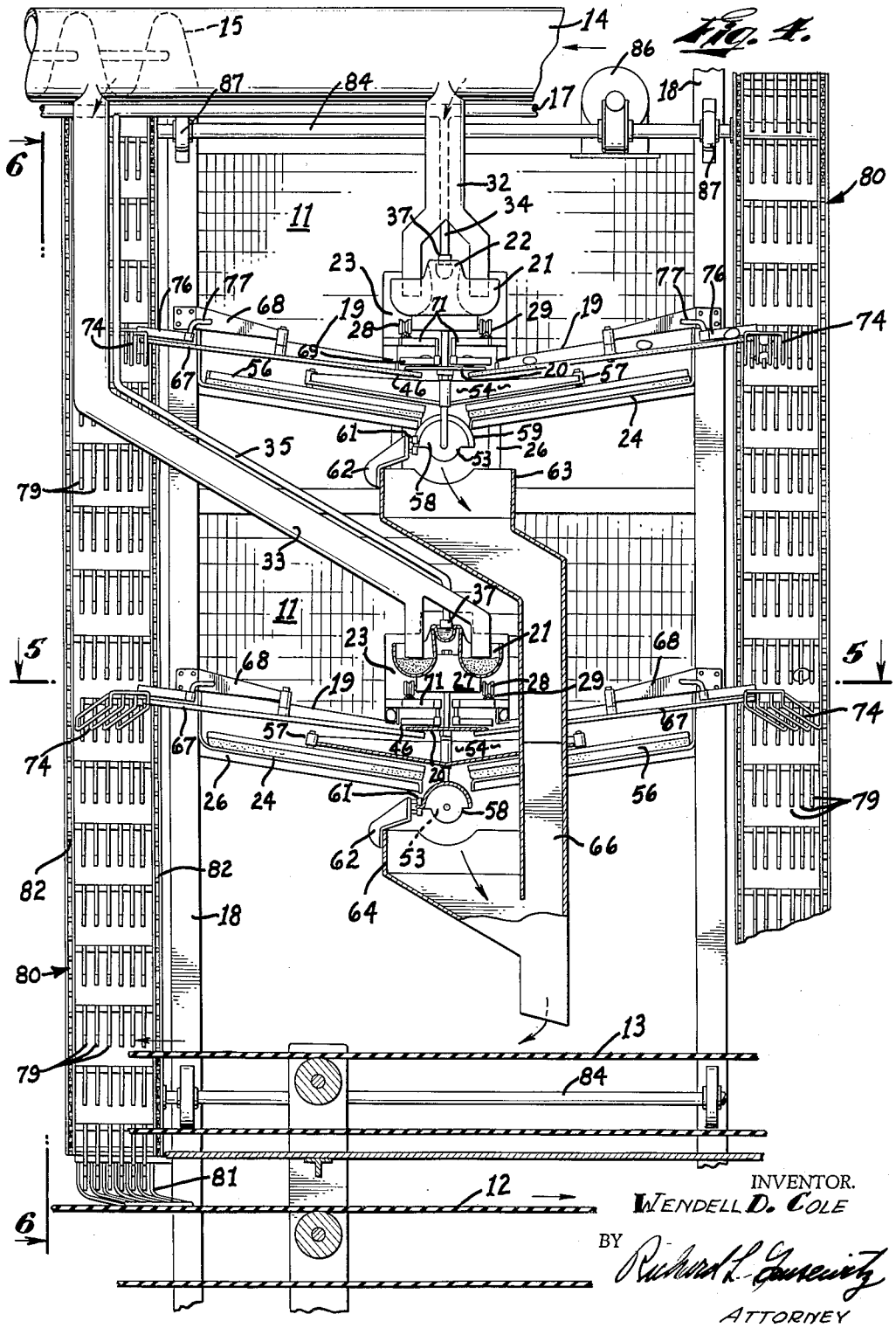
INVENTOR.
WENDELL D. COLE
BY
ATTORNEY June 6, 1961 W. D. COLE 2,987,038
AUTOMATIC LAYING CAGE BATTERY
Filed April 15, 1958 4 Sheets-Sheet 4
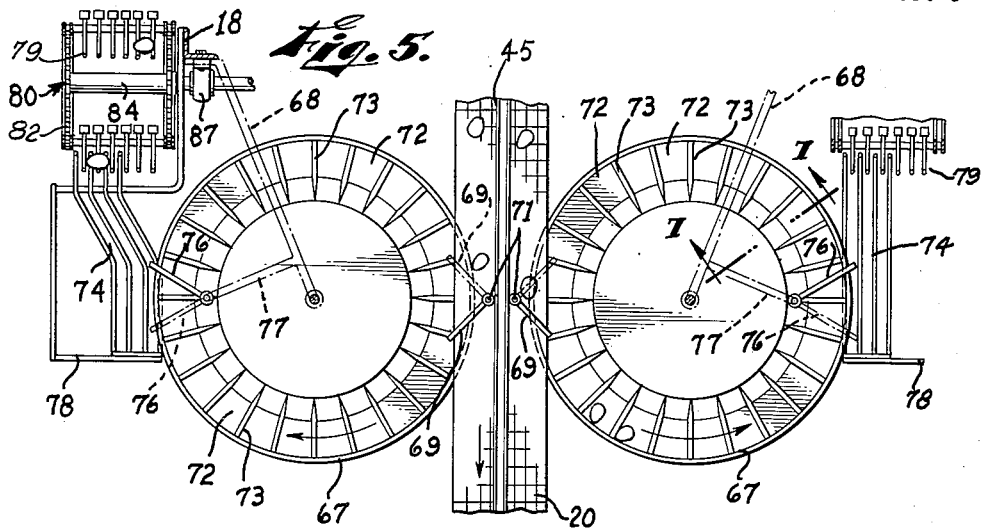
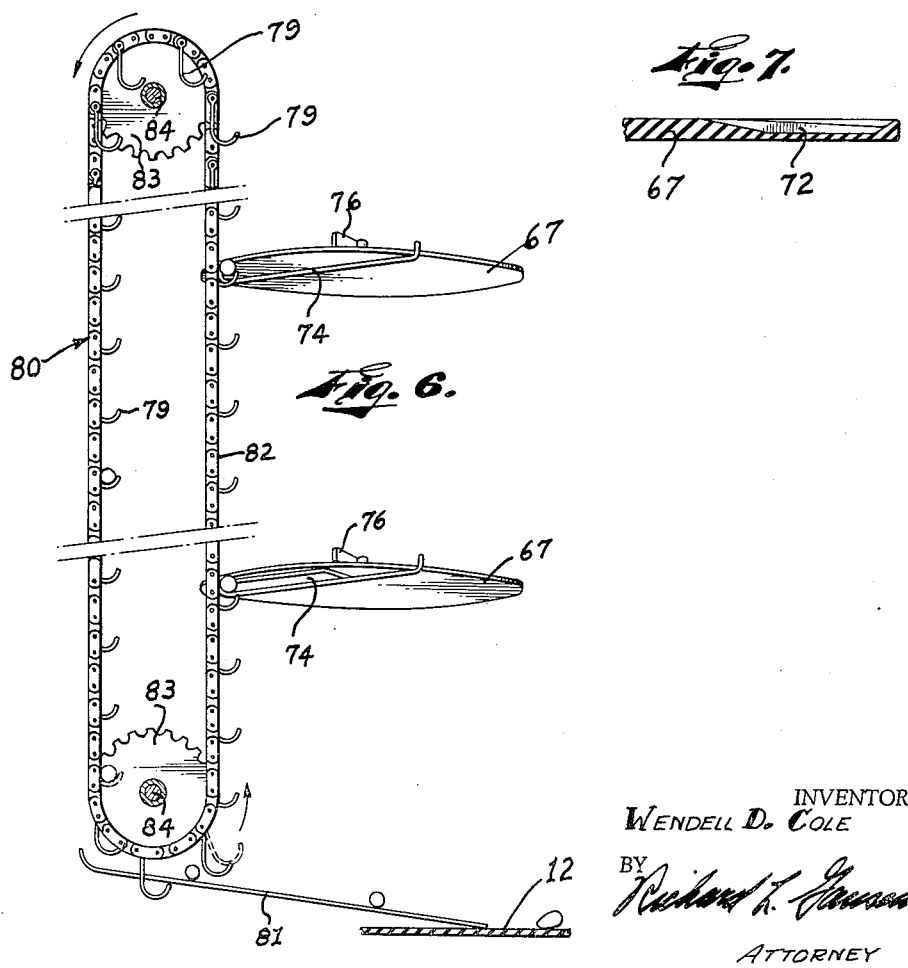
INVENTOR.
WENDELL D. COLE
ATTORNEY

United States Patent Office 2,987,038
Patented June 6, 1961

2,987,038
AUTOMATIC LAYING CAGE BATTERY
Wendell D. Cole, 2510 Valencia, Santa Ana, Calif.
Filed Apr. 15, 1958, Ser. No. 728,681
12 Claims. (Cl. 119—18)

This invention relates to an automatic laying cage battery, and more particularly to improved means for conveying feed, eggs, water and manure in poultry houses.

Various types of automatic equipment have previously been devised for the purpose of distributing feed and water in poultry houses, and collecting eggs therein. Such apparatus has, however, been characterized by large numbers of conveyor belts and other components tending to increase capital and maintenance charges. Such prior-art apparatus was also characterized by large numbers of automatic drinking cups, but these frequently stuck or otherwise operated improperly to result in a deficiency of water or else in flooding. Despite the complexity and high cost of prior-art apparatus of the type indicated, there has not previously been invented an apparatus which conveys not only feed, eggs and water, but also manure, to thus render the operation of the laying cage battery fully automatic.

In view of the above factors characteristic of cage batteries for poultry and the like, and especially laying cage batteries for chickens, it is an object of the present invention to provide a relatively simple, economical, efficient and easily maintained cage battery apparatus which operates in the absence of conveyor belts except in the secondary conveyors leading to the egg room and the compost pile.

Another object is to provide an automatic cage battery characterized by rigid troughs which move between the rows of cages and operate, in the absence of conveyor belts, to transfer material to and from secondary conveyor apparatus.

A further object is to provide automatic laying cage battery equipment for supplying feed and water to cages, and removing eggs and manure therefrom, in a simple, efficient and fully automatic manner.

A further object is to provide a readily-cleaned apparatus for delivering water to poultry cages automatically, and in the absence of valve-operated drinking cups.

Another object is to provide apparatus for removing automatically the manure from cage batteries, thereby greatly reducing labor costs and also reducing the clearance space which must be provided between vertically stacked cages.

These and other objects and advantages of the invention will be more fully set forth in the following specification and claims, considered in connection with the attached drawings to which they relate.

In the drawings:

FIGURE 1 is a highly schematic view illustrating a plurality of spaced parallel cage sections disposed in a poultry house on opposite sides of a central aisle, and also showing secondary conveyor elements mounted in such central aisle;

FIGURE 2 is a greatly enlarged vertical sectional view taken on line 2—2 of FIGURE 1, and showing distributing and collecting apparatus incorporated in each cage section;

FIGURE 3 is a transverse section taken on line 3—3 of FIGURE 2;

FIGURE 4 is a section on line 4—4 of FIGURE 2, and illustrating secondary conveyor elements disposed at the central portion of the poultry house between the inner ends of the cage sections;

FIGURE 5 is a horizontal section taken on line 5—5 of FIGURE 4, illustrating portions of the egg collector means;

FIGURE 6 is a vertical section on line 6—6 of FIGURE 4 and showing egg collector elements in elevation; and FIGURE 7 is an enlarged, detail fragmentary view taken on line 7—7 of FIGURE 5 and illustrating a recess portion of an egg wheel.

Referring first to schematic FIGURE 1, the poultry house is indicated at 10, and has a plurality of cage sections 11 therein. The cage sections are disposed in two banks, one bank on each side of a central aisle. Each bank contains a plurality of parallel units disposed, respectively, in longitudinal or axial alignment with corresponding units of the opposite bank.

Mounted in or near the central aisle between the banks of cage sections 11 are a plurality of conveyor elements. All of these elements will be termed secondary conveyor elements, despite the fact that some convey material toward the cage sections 11 and some convey material away from the cage sections. The primary conveyor elements, which are disposed in the various cage sections 11, transversely of the central aisle, are adapted to convey eggs and manure from the various bird compartments to the secondary conveyor elements, and are also adapted to convey feed and water from the secondary conveyor elements to the bird compartments.

The secondary conveyor elements are illustrated to comprise a motor-driven egg belt 12 which conveys the eggs to an egg room at one end of the central aisle, and a manure or fertilizer belt 13 disposed above the egg belt 12 and adapted to convey manure to a compost pile at the other end of the aisle and externally of the poultry house. The secondary conveyor elements also comprise a feed conduit 14 containing a feed screw 15 and adapted to convey feed from a silo 16 to various discharge points longitudinally of the central aisle. Correspondingly, a water line 17 is provided adjacent the feed conduit 14 for transmission of water to various portions of the primary conveyor means. As best shown in FIGURES 2 and 4, the feed conduit 14 and water line 17 are disposed at a relatively high elevation, above the uppermost tier of cage sections, whereas the egg and fertilizer belts 12 and 13 are disposed relatively adjacent the floor of the building. The secondary conveyor means also include various elevators and chutes, to be described hereinafter.

It is to be understood that various numbers of tiers of cage sections 11 may be stacked vertically and in spaced relationship, depending upon the height of the poultry house and other factors. In the illustrated embodiment, two tiers of cage sections 11, which will be termed the upper and lower tiers of cage sections, are mounted in superposed relationship. It follows that although (in the illustrated embodiment) there are ten cage sections 11 shown in Figure 1, there are actually twenty such cage sections because of the double-decked relationship.

The primary conveyor apparatus for each set of longitudinally aligned cage sections 11 (on opposite sides of the central aisle), and the cage sections 11 themselves, are identical to each other except that they are left and right. Accordingly, only the cage sections and the primary conveyor elements at the upper portion of the showing of FIGURE 1 (adjacent the egg room and silo) will be described in detail, and with particular reference to FIGURES 2–4.

Referring particularly to FIGURES 2–4, the cage sections 11 are mounted on a suitably constructed supporting frame 18 which may comprise a plurality of connected angle irons. The cage sections are each conventionally formed of wire grill work, being provided with open grill bottoms or floors 19 which incline downwardly and toward the center in such manner that eggs will roll onto an egg tray 20 to be described subsequently. The cage sections are suitably partitioned into large numbers of individual bird compartments disposed in side-by-side relationship, the arrangement being such that the birds may insert their heads and necks through suitable cage openings and into feed troughs 21 and a water trough 22 best shown in FIGURE 3. One egg tray 20, the troughs 21 and 22, and the equipment associated therewith, are mounted longitudinally of each tier of cage sections 11 in a longitudinal passage 23 provided between opposed rows of bird compartments. The relationship is thus such that the birds on both sides of the water trough 22 may drink water therefrom, although the separate feed troughs 21 are preferably provided for the birds on opposite sides of the passage 23.

Mounted in spaced relationship below the floor grills 19, on opposite sides of the passage 23 in each cage section tier, are stationary manure pans 24. The manure pans 24 preferably incline downwardly and toward the center, as do the cage bottoms 19, and are spaced apart to provide a slot or passage for automatic manure collecting mechanism to be described hereinafter. The pans 24 are each supported on portions 26 of the supporting frame 18, and are continuous for the full length of each cage section 11.

*Description of the feed and water troughs, and associated mechanism*

Proceeding next to a detailed description of the feed troughs 21, water trough 22 and closely associated parts (excluding the egg-collecting mechanism and manure-collecting mechanism), it is to be understood that a basic principle of the present construction resides in the use of rigid troughs which move bodily and longitudinally of the passages 23 between opposed rows of bird compartments. Such bodily movement of the troughs along their longitudinal axes is to be contrasted with situations in which the troughs are stationary, and conveyor belts or the like are provided to move feed along the troughs.

In greater detail, the troughs 21 and 22 may be formed of a single elongated piece of sheet metal bent into the shape of relatively large U's, for feed trough 21, separated by a small U for water trough 22. The feed troughs are suitably secured to longitudinally spaced blocks 27 (FIGURE 3) having grooved wheels 28 mounted thereon for free rotational movement. The wheels 28 ride on elongated tracks 29 which, in turn, are fixedly supported upon bracket bars 31 secured to various vertical partitions 30 between the bird compartments. Referring particularly to FIGURE 2, it is emphasized that the tracks 29 for each cage tier extend across the central aisle in the poultry house 10 (FIGURE 1) and for the full lengths of both axially aligned cage sections 11 on opposite sides of the central aisle. It follows that the troughs 21 and 22 for each cage tier may serve cages on both sides of the central aisle.

Referring to FIGURE 2, it is pointed out that the troughs 21 and 22 extend for a distance which is substantially greater than the length of the cage section 11 on each side of the central aisle in the poultry house. Stated otherwise, the lengths of the troughs 21 and 22 are such that the inner ends thereof project substantially into the central aisle when the troughs are in either extreme position, the amount of extension being such that branch lines from the feed and water conduits 14 and 17 will remain in the troughs whether such troughs are on the left side of the aisle or on the right side thereof.

As best shown in FIGURES 2 and 4, the feed line for the upper tier of cage sections 11 is indicated at 32 and communicates at its upper end with the feed conduit 14 leading to silo 16. The lower end of the line 32 is separated into two branches (FIGURE 4) disposed in the respective feed troughs 21, the lower ends of the branches being spaced above the bottoms of the troughs. The result is an action whereby feed is delivered into the feed troughs 21 any time the level of the feed drops below that of the lower ends of the branches of line 32. The lower ends of the line 32 serve the further purpose of levelling the feed in the troughs as the troughs 21 move longitudinally therepast.

The feed line to the feed troughs 21 of the lower tier of cage sections 11 is indicated at 33, and is correspondingly branched at its lower end for insertion into the respective feed troughs 21 of the lower tier.

Branch water conduits are provided from main water line 17 and extend downwardly into the water troughs 22 of the upper and lower tiers, as shown at 34 and 35, respectively, in FIGURES 2 and 4. Float valves, schematically indicated at 37, are provided at the lower ends of the lines 34 and 35 to regulate the level of the water in the troughs.

With the described arrangement, the lower ends of the feed and water branch lines are always disposed in the associated feed or water troughs, regardless of the longitudinal positions of the troughs in the cage sections. Thus, as illustrated in FIGURE 2, the troughs 21 and 22 of the upper tier of cage sections are shown as being at their left extreme positions, so that the lower ends of the feed and water lines are disposed clear at the right ends of the troughs. The troughs 21 and 22 of the lower tier are then disposed in the opposite positions, to the right in FIGURE 2, and the lower ends of the associated feed and water branch lines are disposed at the left ends of the troughs. Upon operation of the mechanism next to be described, the positions of the troughs are reversed.

The mechanism for reciprocating the troughs 21 and 22 longitudinally of the opposed cage sections 11 is illustrated to comprise an electric motor 38 connected to a drive sleeve 39 (FIGURE 2) for a flexible drive wire 41. The drive wire 41 extends around pulleys 42, one of which is indicated at the left in FIGURE 2, located at the ends of opposed cage sections 11 remote from each other. The result is a closed loop or circle of drive wire 41. Such wire is suitably connected to the troughs for the upper and lower tiers, so that operation of the motor 38 in opposite directions effects shifting of the troughs back and forth between the left and right extreme positions illustrated in FIGURE 2. With the described arrangement, one motor 38 serves four cage sections.

The reversible electric motor 38 for each set of associated cage sections 11, and also the electric motors for the egg elevators to be described subsequently, may be suitably controlled by a control or timer circuit, shown schematically at 100 in FIGURE 2. The control circuit effects periodic operation of the motors to shift the troughs between the extreme positions indicated, and at time intervals which are empirically determined to result in maximum consumption of feed and water by the birds. It has been found that the periodic feeding of birds, as distinguished from continuous feeding, causes them to consume more feed and water. It has also been found that the location of the feed and water troughs closely adjacent each other causes mixing of some of the feed and water, and that such mixing also results in added consumption of feed and water by the birds.

It is emphasized that the feed troughs are stationary during the great majority of the time that the birds are feeding, this being because the troughs are rapidly reciprocated between their extreme positions and then stopped for predetermined periods. Each bird thus feeds primarily from a single part of the trough, and cannot merely skim off the best feed as from slowly moving troughs.

*Description of the primary egg collecting means*

The primary egg collecting means comprises the egg tray or pan 20 (for each pair of aligned cage tiers) which is adapted to move longitudinally with the feed troughs 21 and water trough 22 in order to convey eggs away from the bird compartments. Each egg tray 20, which may be formed of wire mesh, is suitably supported upon threaded hangers 43 which extend downwardly from the support blocks 27. Suitable cross-braces 44 (FIGURE 3) are employed to maintain the egg tray stable. Divider means 45 are provided longitudinally of the tray to prevent the eggs from rolling into the space between the hangers 43, and thus causing mis-functioning of the means for transferring the eggs to the egg elevators to be described subsequently.

The egg tray 20 is rigidly supported in horizontal position beneath the feed and water troughs, and at substantially the same elevation as that of the inner ends of the bottom walls or floors 19 of the bird compartments. Eggs will therefore roll downwardly along the cage bottoms 19, and through lower open portions of the inner walls (adjacent passage 23) of the bird compartments onto the egg tray 20, at all times when egg gates 46 are in open positions.

The egg gates 46 are best shown in FIGURES 2 and 3, and comprise elongated strips of sheet metal disposed in vertical relationship adjacent the lower and inner edges of the cage bottoms. The egg gates are pivotally connected to crank arms 47 which are rotatably supported in bearing elements 48 (FIGURE 3) provided on the inner ends of the bracket bars 31. Various ones of the crank arms 47 are provided with torsion springs 49 which, in combination with suitable unshown stops, are adapted to maintain the crank arms in such rotated positions that the gates 46 are disposed in the elevated or closed positions, shown in connection with the lower-left tier in FIGURE 2, except when actuated to open (lower) positions as will next be described.

The crank arms 47 at the outer ends of the cage sections 11, that is to say at the ends of the cage sections which are remote from the central aisle in the poultry house, are provided with actuating portions 51 (FIGURE 3) adapted to be engaged by plates 52, the latter being mounted on the blocks 27 beneath the end portions of the troughs 21 and 22. The remaining crank arms 47 are not provided with actuating portions, so that the trip plates 52 do not become effective until the troughs are approaching the extreme positions shown in FIGURE 2.

Upon engagement of the trip plates 52 with actuating portions 51, the crank arms 47 are rotated in bearing elements 48, against the bias of torsion springs 49, to cause downward movement of the egg gates 46 to the lower (open) positions shown in FIGURE 3, and also in FIGURE 2 with relation to the upper-left cage tier. The eggs may then roll from the cage bottoms 19 onto the egg trays 20. The egg gates 46 are maintained open by the trip plates 52 at all times when the associated troughs, trays, etc. are in the extreme positions shown in FIGURE 2, the result being that any eggs laid during the feeding period will immediately roll onto the egg trays. When there are no egg trays adjacent the bird compartments, the closed egg gates serve to collect the eggs until shifting of the egg trays into collecting positions.

Referring to FIGURE 2, it will be observed that the egg gates 46 for the upper-left tier of cage sections 11 are in open (down) positions since the egg tray is then in egg-receiving position. The trip plates 52 at the left end of the trough and tray apparatus for the upper tier of cage sections are then in engagement with the actuating portions 51. The egg gates 46 for the lower-left tier of cage sections are then in closed or upper positions since the trough elements and egg tray means for the lower tier is then on the opposite side of the central aisle.

Upon operation of the motor 38 to shift the trough and tray elements between the illustrated extreme positions, the egg gates for the upper-left tier substantially immediately close, but the egg gates for the upper-right tier do not open until the trough and tray means are substantially in the extreme position on the right side of the aisle. Conversely, the egg gates for the lower tier, and on the right side of the central aisle in FIGURE 2, substantially immediately close as the trough and tray means shift to the left, whereas the egg gates for the lower tier and on the left side of the aisle do not open until the lower troughs and tray have almost reached the extreme left positions.

It is to be understood that the gate mechanisms, etc., for the cage sections on both sides of the central aisle are identical in construction, except that they are left and right. It is also to be understood that the mechanisms at both ends of the troughs and the egg tray (such as the trip plates 52, and the manure-collecting apparatus to be described below) are identical in construction except that they are left and right.

It is emphasized that the above-described arrangement prevents eggs from different compartments from rolling together (as into a common basket) and breaking. Also, the arrangement permits the simple and economical transfer of eggs onto the secondary conveyor means.

*Description of the manure collecting mechanism*

The outer pairs of hangers 43, at both ends of each trough and tray combination, are provided with downwardly extending portions 53 which move longitudinally of the cage sections in the gap or slot between the inner edges of manure pans 24. Each pair of extensions 53 has mounted thereon, in rigid relationship, a combination bracing and supporting bracket 54 which extends outwardly over the manure pans 24. A scraper or wiper element 56, which may include a lower portion formed of elastomeric or plastic material, is mounted over the full width of each manure pan 24 and is pivotally connected to the bracket 54 at 57. Pivot connection 57 for each wiper 56 is disposed outwardly from the center of such wiper, so that the wiper will feather in the desired direction as the bracket and wipers move longitudinally with the troughs and the egg tray.

The extensions 53 on each end of the trough and tray apparatus have pivotally mounted thereon a manure bucket 58 which is sufficiently long that it will be disposed below the inner ends of the scraper elements 56 regardless of the feathered positions thereof. In this connection, it is pointed out that the degree of feathering of the elements 56 is limited by suitable stop means, not shown. Each manure bucket 58 has a cam track 59 formed on the lower surface thereof. The cam track is adapted to be received between cooperating cam-actuator wheels 61 which are suitably supported on brackets 62 (FIGURE 4), in the central aisle between the axially aligned cage sections 11. Referring to FIGURES 2 and 4, it is pointed out that the cam tracks 59 are so curved that wheels 61 cause inversion of the buckets 58 upon each shifting of the buckets into the central aisle. Thus, the right bucket for the upper cage tier, FIGURE 2, is shown as inverted or in dumping position, whereas the left bucket for the lower cage tier in FIGURE 2 is shown as in inverted or dumped position. Upon shifting of the trough and tray mechanisms to the opposite extreme positions, due to operation of the motor 38, the remaining buckets 58 are dumped.

The buckets 58 dump into upper and lower hoppers 63 and 64 which feed into a chute 66 terminating above the manure belt 13 (FIGURES 1, 2 and 4) leading to the compost pile. Referring to FIGURE 2, it is pointed out that the hoppers 63 and 64 are sufficiently wide to receive manure dumped from the buckets at both ends of the trough-tray combinations, so that a single set of cam actuator wheels 61 (for each tier) may effect dumping of the buckets 62 at both ends of the trough-tray apparatus.

*Description of the egg elevator apparatus*

The egg elevators, for conveying the eggs between the primary collecting trays 20 and the egg conveyor belt 12, form part of the secondary conveyor means and are best illustrated in FIGURES 4–7. The elevators include a pair of egg wheels or discs 67 mounted in the central aisle on opposite sides of the egg tray 20 for each tier of cage sections. The egg wheels 67 are rotatably mounted on suitable brackets 68 (FIGURE 4), and have their inner edges lapped closely beneath the egg tray 20 for each tier in order that eggs wiped off of the egg tray will roll onto the egg wheels. Such wiping of the eggs onto the egg wheels is accomplished by arms 69 which are pivotally mounted on brackets 71 supported by the mounting means for the tracks 29. The arms 69 are adapted to pivot about vertical axes between the solid and dashed line positions shown in FIGURE 5, there being suitable stop means provided to limit the degree of pivoting. The arms are frictionally associated with the tray 20 in such manner that motion of the tray effects pivoting of the arms between the indicated positions. Thus, when the tray is moving in the direction indicated by the arrow in FIGURE 5, the arms 69 are pivoted to the solid line positions and effect wiping of the eggs onto the peripheral portions of the wheels 67. Upon reverse movement of the tray 20, the arms 69 pivot to the opposite positions and effect a similar wiping of eggs onto the tray as it moves therepast.

The egg wheels 67 may be rotated in suitable directions by motor means, not shown, or they may be frictionally associated with the egg tray 20 in such manner that driving of the egg tray effects rotation of the egg wheels in the appropriate directions. Thus, and referring to FIGURE 5, the left wheel is shown as rotating clockwise and the right wheel as rotating counterclockwise, due to shifting of the egg tray 20 in the direction indicated by the arrow. Upon reversal of the egg tray movement, the wheels rotate in the opposite directions.

The egg discs 67 have formed on their upper peripheral surfaces a large number of circumferentially adjacent recesses 72 (FIGURES 5 and 7) into which the eggs are shifted by the wiper or brusher arms 69. Such recesses, and the partitions 73 separating the same, permit the egg wheels to be slightly inclined (FIGURE 4) and still effect conveying of the eggs. The recesses are, however, sufficiently shallow that when the eggs reach stations diametrically opposite arms 69 they may be similarly wiped or brushed onto chutes 74 formed of parallel wires. This is effected by wiper or brusher arms 76 which are mounted on brackets 77 connected to the brackets 68. Arms 76 are frictionally associated with the wheels 67, so that they are pivoted between the indicated solid and dashed line positions at which they are retained by suitable stop means, not shown.

The chutes 74, which are mounted on suitable brackets 78 (FIGURE 5), incline downwardly and have their lower ends suitably hooked to maintain the eggs, after they have rolled down the chutes, in position for engagement by hook elements 79 of elevator devices 80. As best shown in FIGURE 6, the hook elements 79 move upwardly between the hooked ends of the wires of chutes 74 and effect lifting of the eggs therefrom. The eggs thus lifted are conveyed upwardly and then downwardly, in Ferris wheel fashion, until they are deposited on the upper ends of lower chutes 81 which incline downwardly and effect shifting of the eggs onto the previously described egg belt 12. The lower chutes 81 are also formed of wire, so that the hook elements 79 may pass therebeneath until the eggs are free to roll downwardly onto the belt 12, as shown at the lower portion of FIGURE 6.

Hook elements 79 are pivotally associated with suitable cross members secured at various spaced positions along chains 82. Chains 82, in turn, are mounted on sprockets 83 which are fixed on shafts 84 best shown in FIGURE 4. The upper shaft 84 is suitably driven by an electric motor 86. The motor 86 is operated, in timed relation with operation of the motors 38, by the control means previously mentioned. The shafts 84 are suitably journaled in bearings 87 on supporting frame 18.

*Brief summary of operation*

The following description will be made with reference to only two sets of axially aligned cage sections 11, for example the cage sections 11 nearest the silo 16 and on the left and right sides of the central aisle in the poultry house, as viewed in FIGURE 1. It is to be understood, however, that the operation is the same with reference to the other sets of cage sections, although the cage section sets may be sequentially operated in order to prevent excessive drainage of electric power from the line. The secondary egg belt 12, manure belt 13, etc., are operated at all times when primary conveyor elements are in operation.

Let it be assumed that the parts are initially in the positions shown in FIGURE 2. The feed and water troughs 21 and 22 of the upper tier of cage sections 11 are then disposed on the left of the central aisle, and the troughs of the lower tier are disposed on the right of the central aisle. It follows that the birds in the bird compartments of the adjacent cage sections may then eat and drink as much food and water as they desire. The egg gates 46 for such cage sections are then held open (FIGURE 3) due to engagement of the plates 52 with actuating portions 51 of crank arms 47 for the gates. It follows that eggs laid by the chickens in such compartments will roll down the cage bottoms 19 and onto the egg trays 20.

As soon as the chickens in the upper-left and lower-right tiers of cage sections (FIGURE 2) have had sufficient time to eat and drink, the electric motors 38 (FIGURE 2) and 86 (FIGURE 4) are started by the control apparatus, not shown. Starting of the motor 38 operates through the pulley 39 and drive wire 41 to shift the associated troughs 21 and 22, egg trays 20, and manure collecting apparatus 56 and 58 (FIGURE 3) along tracks 29 to the opposite extreme positions. The movable elements are then in the cage sections at the upper-right and lower-left in FIGURE 2.

As the feed troughs 21 move between the indicated positions, they are maintained filled and leveled by the lower ends of the feed lines 32 and 33 leading from the main feed conduit 14. The water troughs are maintained full at all times by the float valves at the lower ends of lines 34 and 35.

As soon as the movable components start to shift between the indicated positions, the actuating plates 52 (FIGURE 3) shift out of engagement with actuating portions 51 of the crank arms for egg gates 46, permitting the springs 49 to pivot the crank arms 46 until the egg gates are in their uppermost positions preventing rolling of eggs off the cage bottoms 19. All eggs which rolled onto the egg trays 20 prior to closing of the gates 46 are wiped or brushed from the egg trays 20 (FIGURE 5) by the arms 69. The eggs are then deposited on the egg wheels 67, brushed by the arms 76 onto the chutes 74, and conveyed from the lower ends of the chutes 74 by the egg elevator mechanisms 80 onto the lower chutes 81 and thus onto the egg belt 12 leading to the egg room.

The shifting of the movable elements between the indicated extreme positions also effects cleaning of manure from the manure pans 24 by the wiper elements 56 which move with the troughs and with the egg trays 20. The wiper elements 56 effect scraping of the manure from the pans 24 into the buckets 58. Such buckets are automatically dumped into the hoppers 63 and 64, when they reach the center aisle, by means of the cam-actuator wheels 61 and cam tracks 59 previously described. The manure is thus deposited automatically through the chute 66 and onto the manure belt 13 leading to the compost pile.

As soon as the chickens in the upper-right and lower-left cage portions (FIGURE 2) have had sufficient time to eat and drink, the movable elements are returned to the illustrated positions, and the cycle is repeated.

Various embodiments of the present invention, in ad-

I claim:

1. A poultry servicing apparatus for use with a multiplicity of cages arranged in substantial alignment and extending substantially equal distances from a central point, comprising a service unit extending along said cages and having a length substantially equal to one-half the length of said multiplicity of cages, said service unit being adapted to reciprocate along said cages from a first position adjacent one half of said cages to a second position adjacent the other half of said cages and thence back to said first position, and stationary material-transfer means operatively associated with said service unit in any of its positions of movement, whereby material transfer may occur relative to said service unit during periods when said service unit is shifting between said positions.

2. The invention as claimed in claim 1, in which said service unit comprises a feed-supporting element so disposed and related relative to said cages that birds in said one half of said cages may feed therefrom when said element is in said first position and birds in said other half of said cages may feed therefrom when said element is in said second position, and in which said material-transfer means comprises a feed-replenishing means located in the vicinity of said central point to replenish said element with feed during shifting thereof between said first position and said second position.

3. The invention as claimed in claim 2, in which said feed-replenishing means comprises a feed hopper disposed above said element and having a discharge outlet means disposed a short distance above the bottom wall of said element, said outlet means being adapted automatically and in cooperation with said bottom wall to replenish said element with feed to the level of said outlet means.

4. The invention as claimed in claim 1, in which said service unit comprises an egg-supporting element so disposed and related relative to said cages that eggs laid by birds in said one half of said cages may discharge onto said element when said element is in said first position and eggs laid by birds in said other half of said cages may discharge onto said element when said element is in said second position, in which gate means are provided for blocking discharge of eggs from said cages while said gate means are in closed condition, and in which said material-transfer means comprises egg-removal means located in the vicinity of said central point to remove eggs from said element during shifting thereof between said first position and said second position.

5. The invention as claimed in claim 4, in which said gate means comprises first gate apparatus for effecting discharge of eggs from said one half of said cages when said element is in said first position, and second gate apparatus for effecting discharge of eggs from said other half of said cages when said element is in said second position.

6. The invention as claimed in claim 5, in which said egg-removal means comprises an elongated moving egg conveyor intersecting said element in the vicinity of said central point, and means to effect transfer of eggs from said element to said conveyor, said element and conveyor cooperating with each other and with said first and second gate apparatus in such manner that eggs laid by different chickens in said cage to not come into contact with each other.

7. The invention as claimed in claim 5, in which actuating means are provided on said element to effect opening of said first gate apparatus only when said element is in substantially said first position, and to effect opening of said second gate apparatus only when said element is in substantially said second position.

8. The invention as claimed in claim 1, in which said service unit comprises a water trough so disposed and related relative to said cages that birds in said one half of said cages may drink therefrom when said trough is in said first position and birds in said other half of said cages may drink therefrom when said trough is in said second position, and in which said material-transfer means comprises water-supply means disposed in the vicinity of said central point.

9. The invention as claimed in claim 8, in which said water-supply means includes a float valve located in said trough to maintain the same filled with water to a predetermined level.

10. The invention as claimed in claim 1, in which control and actuating means are provided to maintain said service unit stationary in said first position for a substantial period of time, thereafter to shift said service unit from said first position to said second position, thereafter to maintain said service unit stationary in said second position for a substantial period of time, and thereafter to shift said service unit from said second position to said first position.

11. The invention as claimed in claim 1, in which said service unit comprises an elongated rigid element adapted to reciprocate on track means running parallel to said cages for the full length of said multiplicity of cages.

12. The invention as claimed in claim 1, in which said cages have openings at the front sides thereof through which birds may insert their heads to feeding positions, in which said cages have inclined bottom walls adapted to deliver eggs toward locations below said feeding positions; in which said service unit comprises two rigid and parallel portions one of which is a feed trough disposed at said feeding positions and the other of which is an egg tray disposed at said locations below said feeding positions; in which gate means are provided to prevent discharge of eggs from said inclined bottom walls except when said egg tray is adjacent thereto; in which said stationary material-transfer means comprises a feed hopper disposed adjacent said central point to deliver feed to said feed trough and an egg-collector element disposed adjacent said central point to receive eggs from said egg tray; and in which means are provided to effect conjoint reciprocation of said feed trough and egg tray between said first and second positions.

References Cited in the file of this patent

UNITED STATES PATENTS

| | | |
|---|---|---|
| 2,197,160 | Schuppner | Apr. 16, 1940 |
| 2,264,156 | Apple | Nov. 25, 1941 |
| 2,314,344 | Cornell et al. | Mar. 23, 1943 |
| 2,383,326 | Lovell | Aug. 21, 1945 |
| 2,390,924 | Cornell et al. | Dec. 11, 1945 |
| 2,536,621 | Arnold | Jan. 2, 1951 |
| 2,576,154 | Trautvetter | Nov. 27, 1951 |
| 2,586,979 | Myers | Feb. 26, 1952 |
| 2,601,844 | Lovell | July 1, 1952 |
| 2,687,113 | Gault | Aug. 24, 1954 |
| 2,735,400 | Stubbs | Feb. 21, 1956 |
| 2,745,379 | Schmidt | May 15, 1956 |
| 2,793,614 | Duncan | May 28, 1957 |
| 2,851,990 | Rowland | Sept. 16, 1958 |

FOREIGN PATENTS

| | | |
|---|---|---|
| 1,029,704 | France | Mar. 11, 1953 |
| 1,030,696 | France | Mar. 18, 1953 |
| 934,614 | Germany | Dec. 22, 1955 |